(12) United States Patent
Park et al.

(10) Patent No.: US 9,884,588 B2
(45) Date of Patent: Feb. 6, 2018

(54) DRIVER SUPPORTING DEVICE AND WARNING TIMING CONTROL METHOD

(71) Applicant: MITSUBISHI ELECTRIC CORPORATION, Tokyo (JP)

(72) Inventors: Shinyoung Park, Tokyo (JP); Shu Murayama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/519,263

(22) PCT Filed: Oct. 17, 2014

(86) PCT No.: PCT/JP2014/077702
§ 371 (c)(1),
(2) Date: Apr. 14, 2017

(87) PCT Pub. No.: WO2016/059724
PCT Pub. Date: Apr. 21, 2016

(65) Prior Publication Data
US 2017/0225614 A1    Aug. 10, 2017

(51) Int. Cl.
*B60Q 1/00*    (2006.01)
*B60Q 5/00*    (2006.01)
(Continued)

(52) U.S. Cl.
CPC .......... *B60Q 5/006* (2013.01); *G01S 13/931* (2013.01); *G08G 1/16* (2013.01);
(Continued)

(58) Field of Classification Search
CPC ............. B60Q 5/006; G01S 13/931; G01S 2013/9353; G01S 2013/9364; G01S 2013/9367; B60R 21/0134; B60R 21/01322; B60R 21/00; B60R 21/013; B60R 21/015; B60R 21/01512; B60R 21/01552; B60R 21/01556;
(Continued)

(56) References Cited

U.S. PATENT DOCUMENTS 6,507,779 B2 *   1/2003   Breed ................... B60N 2/002
                                                 280/734
6,856,873 B2 *   2/2005   Breed ................... B60N 2/002
                                                 180/271
(Continued)

FOREIGN PATENT DOCUMENTS

JP    2006-182325 A    7/2006
JP    2007-72570 A     3/2007
(Continued)

*Primary Examiner* — Hai Phan
*Assistant Examiner* — Jonathan R Beckley
(74) *Attorney, Agent, or Firm* — Birch, Stewart, Kolasch & Birch, LLP (57) ABSTRACT

Disclosed is a driver supporting device including: a warning timing control unit for setting a timing at which to output warning data in accordance with the existence or non-existence of a passenger when it is determined that a warning target which possibly collides with a driver's vehicle exists ahead of the driver's vehicle, and a warning data outputting unit for outputting the warning data in accordance with the timing set by the warning timing control unit.

7 Claims, 6 Drawing Sheets

(51) Int. Cl.
*G01S 13/93* (2006.01)
*G08G 1/16* (2006.01)

(52) U.S. Cl.
CPC .............. *G01S 2013/9353* (2013.01); *G01S 2013/9364* (2013.01); *G01S 2013/9367* (2013.01)

(58) Field of Classification Search
CPC ...... B60R 2300/8093; B60R 2300/802; B60R 2021/0004; B60W 50/14; B60W 2050/143; B60W 2050/146; B60W 2040/0861; G06K 9/00832; G06K 9/00362; G06K 9/00597; G06K 9/00845; G06K 9/00838; G06K 9/00805; B60N 2/002; B60N 2002/4485; G06F 3/013
See application file for complete search history.

(56) References Cited

U.S. PATENT DOCUMENTS

| | | | | |
|---|---|---|---|---|
| 6,859,144 B2* | 2/2005 | Newman | ................ | B60Q 9/008 340/436 |
| 8,044,782 B2* | 10/2011 | Saban | ................... | B60N 2/002 340/438 |
| 8,248,219 B2* | 8/2012 | Sato | ......................... | B60Q 9/00 340/425.5 |
| 8,344,894 B2* | 1/2013 | Szczerba | .............. | B60K 28/066 340/435 |
| 8,427,395 B2* | 4/2013 | Seder | ................... | G01S 13/723 345/7 |
| 8,629,784 B2* | 1/2014 | Szczerba | .............. | G01S 13/723 340/438 |
| 8,643,724 B2* | 2/2014 | Schofield | ................. | B60R 1/00 348/113 |
| 9,637,120 B2* | 5/2017 | Laur | ..................... | B60W 30/09 |
| 9,650,041 B2* | 5/2017 | Feit | ....................... | B60W 30/09 |
| 9,718,405 B1* | 8/2017 | Englander | ............. | B60Q 9/008 |
| 9,718,468 B2* | 8/2017 | Barfield, Jr. | ........ | B60W 30/095 |

FOREIGN PATENT DOCUMENTS

| | | |
|---|---|---|
| JP | 2007-207047 A | 8/2007 |
| JP | 2008-143381 A | 6/2008 |
| JP | 2009-181286 A | 8/2009 |
| JP | 2009-298192 A | 12/2009 |
| JP | 2011-164712 A | 8/2011 |
| JP | 5134448 B2 | 1/2013 |

* cited by examiner

Coefficient of Friction of Tire against Various Road Surfaces

| Road Surface | Coefficient of Friction of Tire |
|---|---|
| Dry Asphalt/Dry Concrete, and Tires Are in Good State | 0.8 |
| Dry Asphalt/Dry Concrete, and Tires Are in Normal State | 0.7 |
| Dry Asphalt/Dry Concrete, and Tires Are in Wear-out State | 0.6 |
| Wet Concrete | 0.5 |
| Wet Asphalt | 0.45 TO 0.6 |
| Gravel Road | 0.55 |
| Dry Non-Paved Road | 0.65 |
| Wet Non-Paved Road | 0.4 TO 0.5 |
| Hard Snow | 0.15 |
| Ice | 0.07 |

FIG.5

Deceleration Time Different in
Accordance with Driver Characteristics

FIG.6   Criterion by Which to Determine Initial Setting

| Gender | Age | Determination |
|---|---|---|
| Male | Less Than 20 Years Old | Dc2 |
| | Thirties | Dc2 |
| | Forties | Dc1 |
| | Fifties | Dc1 |
| | Sixties | Dc3 |
| | Seventies | Dc4 |
| | Eighties | Dc5 |
| | 90 Years Old or Older | Dc6 |
| Female | Twenties | Dc3 |
| | Thirties | Dc2 |
| | Forties | Dc1 |
| | Fifties | Dc2 |
| | Sixties | Dc4 |
| | Seventies | Dc5 |
| | Eighties | Dc6 |
| | 90 Years Old or More | Dc7 |

FIG.7

Sound Which Can Be Recognized
(Comparison between Young Persons and Elderly Persons)

FIG.8

Definition of Elderly or Weak Persons

| Age | Definition 1 | Definition 2 |
|---|---|---|
| Less Than 28 Days Old after Birth | Newborn Babies | Elderly or Weak Persons |
| 28 Days Old after Birth to Less Than 1 Year Old | Babies | |
| One Year Old to Pre-school Age (Less Than 6 Years Old) | Small Children | |
| 6 Years Old to Less Than 18 Years Old | Children | |
| 18 Years Old to Less Than 65 Years Old | Adult | General Persons |
| 65 Years Old to Less Than 75 Years Old | Early Elderly Persons | Elderly or Weak Persons |
| 75 Years Old or More | Late Elderly Persons | Elderly or Weak Persons |
| Weak Persons and So on Including Pregnant Women and Physically Handicapped Persons | | Elderly or Weak Persons |

FIG.9

Degrees of Safety Respectively Set to Seats
(The Larger Numerical Value, The Higher Degree of Safety)

DRIVER SUPPORTING DEVICE AND WARNING TIMING CONTROL METHOD

TECHNICAL FIELD

The present invention relates to a driver supporting device for vehicles, for outputting a warning to urge a driver to perform a braking operation, thereby supporting the driver, and a warning timing control method used in driver supporting devices.

BACKGROUND ART

In recent years, technologies used in vehicles such as cars to detect traveling surroundings outside a vehicle and recognize an obstacle and a preceding vehicle by using a vehicle-mounted camera, a laser radar device, or the like, and to perform various driving support controlling operations, such as a warning outputting operation, an automatic braking operation, and an automatic steering operation, thereby preventing collisions of vehicles and improving the safety, have been developed and put in practical use.

For example, Patent Literature 1 discloses a technology of urging the driver of a vehicle to perform a braking operation, thereby preventing collisions, by controlling a warning timing in accordance with the degree of risk of collision with a preceding vehicle or a following vehicle.

Further, for example, Patent Literature 2 discloses a technology of controlling a warning timing in accordance with the speed at which the brake pedal of a driver's vehicle is stepped on, and, when detecting a following vehicle, and advancing the timing at which a warning is presented, thereby appropriately preventing an excessive approach of the following vehicle which results from the braking control on the driver's vehicle.

Further, for example, Patent Literature 3 discloses a technology of comparing a driver's specific spare time for operation with time-to-collision, and, when the time-to-collision is less than the driver's specific spare time for operation, determining that the driver's state is not a normal state, and outputting a warning.

CITATION LIST

Patent Literature

Patent Literature 1: Japanese Unexamined Patent Application Publication No. 2007-207047
Patent Literature 2: Japanese Unexamined Patent Application Publication No. 2006-182325
Patent Literature 3: Japanese Unexamined Patent Application Publication No. 2009-298192

SUMMARY OF INVENTION

Technical Problem

However, a problem with conventional technologies like those disclosed in above-mentioned Patent Literatures 1 and 2 is that because the driving characteristics of each driver are not taken into consideration, even if a warning is outputted at the same timing, the driver cannot necessarily avoid a collision and so on. A further problem is that the existence or non-existence of a passenger is not taken into consideration, and therefore there is a possibility that a more appropriate warning which provides a passenger, especially a child or the like in the rear seat, who is not conscious of the traffic situation ahead of the vehicle, with a feeling of safety cannot be presented.

A problem with Patent Literature 3 is that, in contrast to the technologies disclosed in above-mentioned Patent Literatures 1 and 2, Patent Literature 3 discloses the technology of taking the driving characteristics of each driver into consideration, and controlling the warning timing in accordance with a driver's characteristics, thereby presenting a natural, comfortable warning suited to each driver, but the existence or non-existence of a passenger is not taken into consideration, like in the case of Patent Literatures 1 and 2, and therefore there is a possibility that a more appropriate warning which provides a passenger, especially a child or the like in the rear seat, who is not conscious of the traffic situation ahead of the vehicle, with a feeling of safety cannot be presented.

The present invention is made in order to solve the above-mentioned problems, and it is therefore an object of the present invention to provide a driver supporting device and a warning timing control method capable of presenting a more appropriate warning which does not make the driver feel inconvenience and which also provides passengers with a feeling of safety, at a timing at which to issue a warning for a warning target, by controlling the timing at which to issue the warning in accordance with the existence or non-existence of a passenger.

Solution to Problem

According to the present invention, there is provided a driver supporting device that outputs warning data to urge a driver to perform a braking operation in order to prevent a collision with a warning target, the a driver supporting device including a warning timing control unit to set a timing at which to output the warning data in accordance with existence or non-existence of a passenger when it is determined that a warning target which possibly collides with a driver's vehicle exists ahead of the driver's vehicle, and a warning data outputting unit to output the warning data in accordance with the timing set by the warning timing control unit, wherein when a passenger exists, the warning timing control unit sets, in addition to a first timing at which to output warning data to urge the driver to perform the braking operation, a second timing at which to output warning data for the passenger in accordance with a line of sight of the passenger, the second timing being advanced relative to the first timing, and the warning data outputting unit outputs the respective warning data in accordance with the first and second timings set by the warning timing control unit.

Advantageous Effects of Invention

According to the present invention, there can be provided a driver supporting device and a warning timing control method capable of presenting a more appropriate warning which does not make the driver feel inconvenience and which also provides passengers with a feeling of safety, at the timing at which to issue a warning for a warning target, by controlling the timing at which to issue the warning in accordance with the existence or non-existence of a passenger.

DESCRIPTION OF EMBODIMENTS

Hereafter, the preferred embodiments of the present invention will be explained in detail with reference to the drawings.

Embodiment 1.

First, an example for reference of a flow of operations which a driver performs until he or she avoids a collision after a warning sound has been outputted will be explained.

Figure 1:
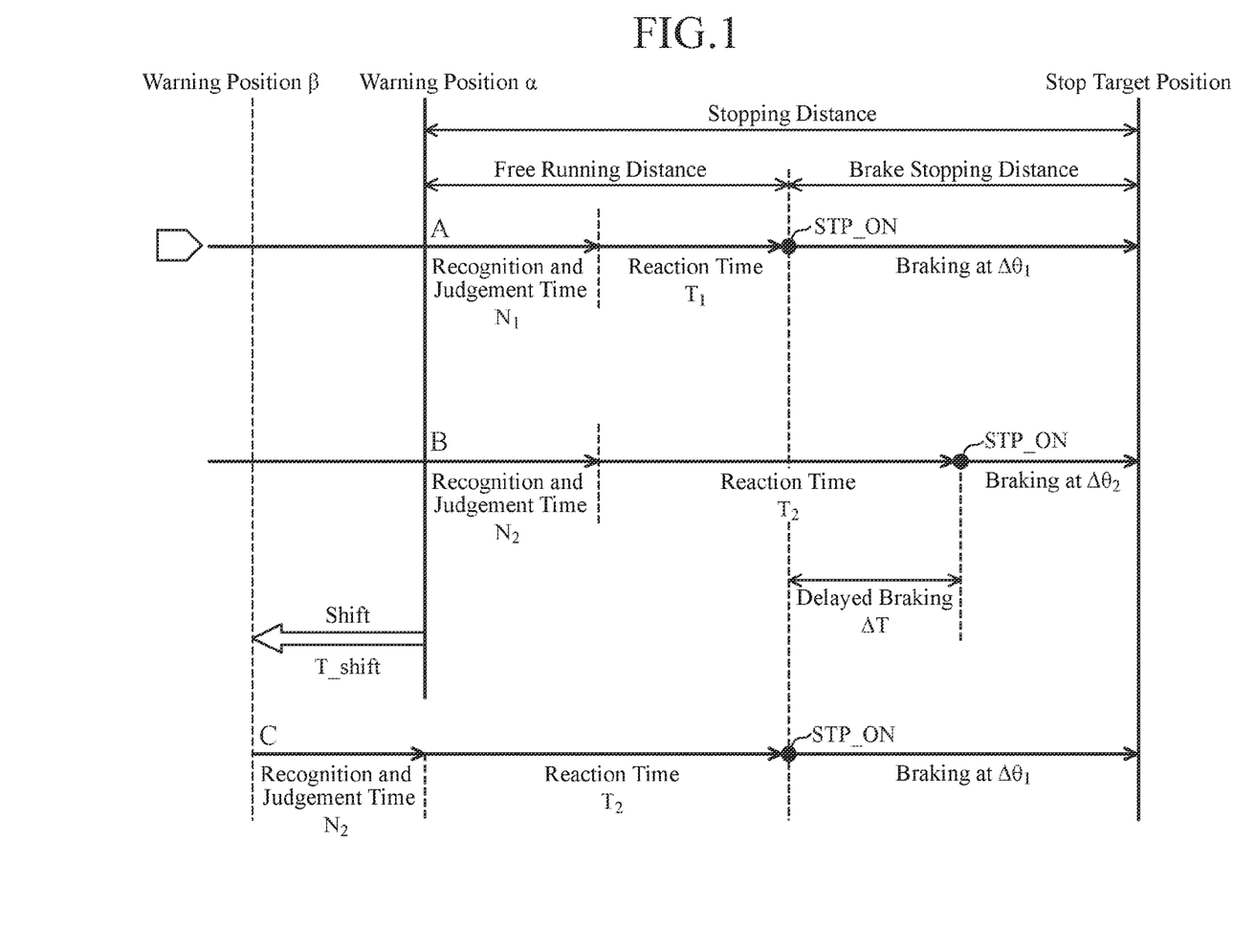
FIG. 1 is a diagram explaining a flow of the states of operations performed by a driver, the operations including a brake pedaling operation, until his or her vehicle is stopped after a warning sound has been outputted.

FIG. 1 is a diagram explaining a flow of the states of operations performed by the driver, the operations including a brake pedaling operation, until his or her vehicle is stopped after a warning sound has been outputted.

In this embodiment, it is assumed that the driver of the vehicle starts a brake pedaling operation in response to a warning sound and stops the vehicle at a stop target position. In this embodiment, the stop target position is located at a preset distance from a warning target on the near side of the warning target and serves as a target position at which the vehicle should be stopped.

In FIG. 1, an upper pattern A shows a normal pattern in which the driver brakes the vehicle at a slow brake pedaling speed until reaching the stop target position and stops the vehicle with a safety margin, and a middle pattern B shows a pattern in which the driver has no other choice but to stop the vehicle with sudden brakes applied because of his or her relatively long reaction time.

In either of the patterns A and B, a warning sound is outputted at a warning position α that is separated by a stopping distance from the stop target position on the near side thereof in such a way that the vehicle can stop at the stop target position which is calculated by using the relative speed and the distance between the vehicle and the warning target.

The stopping distance is the distance which the vehicle needs to travel until the vehicle is stopped, and can be divided into a free running distance and a brake stopping distance. The free running distance is the distance which the vehicle travels during a time period which elapses from the output of the warning sound to the start of a brake pedaling operation (STP_ON), and the brake stopping distance is the distance which the vehicle travels while the driver performs the brake pedaling operation.

The period of time during which the vehicle travels the free running distance can be further divided into a recognition and judgement time N required for the driver to recognize and judge the warning sound outputted, and a reaction time T required for the driver to take his or her foot off the accelerator and then move his or her foot to the brake pedal.

In the pattern A, the driver recognizes and judges the warning sound outputted at the warning position α in a time $N_1$, smoothly takes his or her foot off the accelerator and then steps on the brake pedal in a time $T_1$, and operates the brake pedal at a smooth stepping speed $\Delta\theta_1$ after starting a brake pedaling operation at STP_ON.

In contrast, the pattern B shows a case in which the driver has a relatively long reaction time as his or her brake pedaling operation characteristic. Although it is assumed that the recognition and judgement time $N_2$ is substantially the same as that in the normal pattern ($N_2=N_1$), the reaction time $T_2$ is longer than $T_1$ in the normal pattern ($T_2>T_1$), as shown in FIG. 1. This is a tendency seen, in a case where the driver is, for example, an elderly person.

Thus, because the stop target position is not changed even if the reaction time T increases and the start of the brake pedaling operation STP_ON is delayed, in the case of the pattern B, the driver must step on the brake pedal more quickly ($\Delta\theta_2>\Delta\theta_1$) after the start of the brake pedaling operation (STP_ON), which could lead to a sudden braking operation.

Therefore, when a sudden braking operation is performed because the driver takes a longer reaction time T than that usual, as shown in the pattern B, the timing at which to output the warning sound earlier is advanced to an earlier time so as to output the warning sound, as shown in a pattern C.

According to Embodiment 1, in addition to changing the timing at which to output the warning sound in accordance with the driver's characteristics, like in the case of the above-mentioned example for reference, the timing at which to output the warning sound is changed more appropriately in accordance with a passenger's state.

Figure 2:
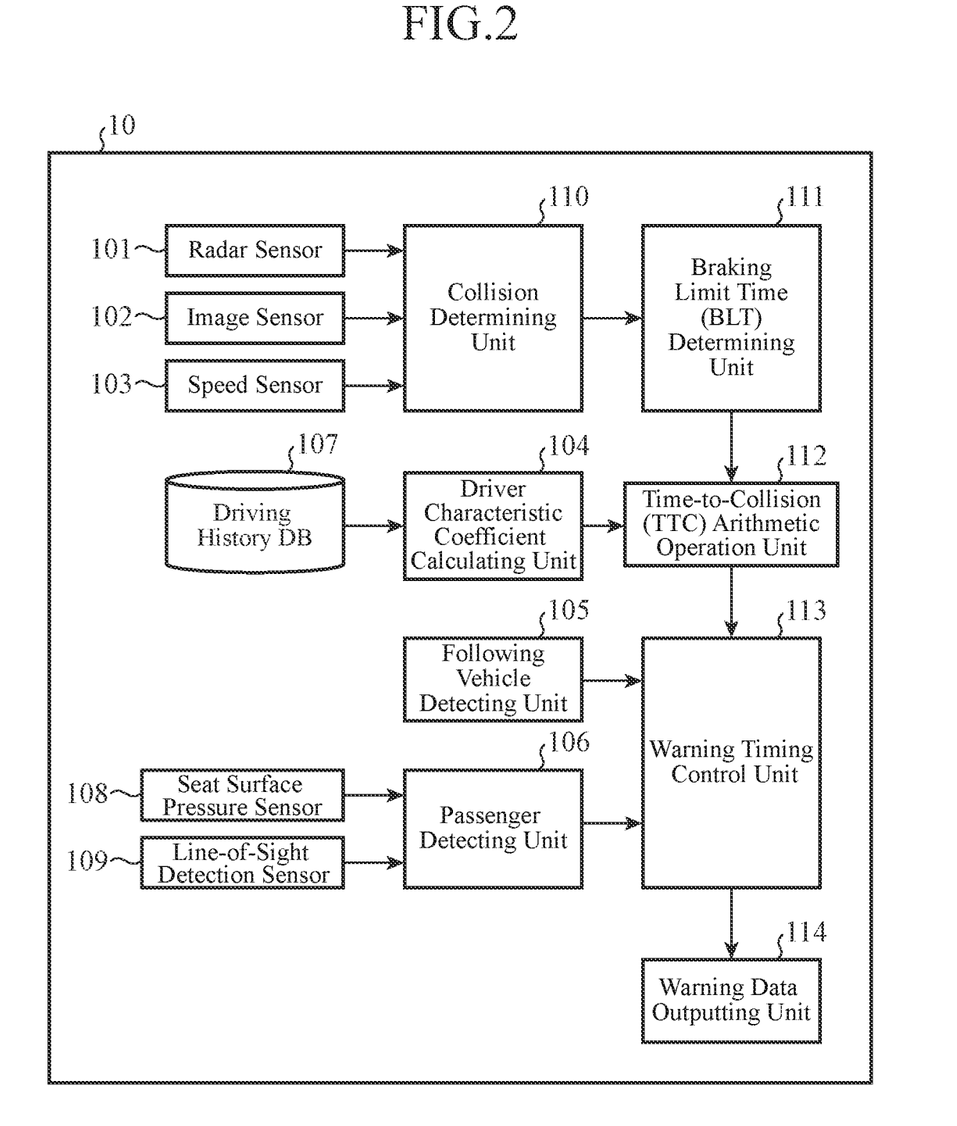
FIG. 2 is a structural diagram of a driver supporting device according to Embodiment 1 of the present invention.

FIG. 2 is a structural diagram of a driver supporting device 10 according to Embodiment 1 of the present invention.

As shown in FIG. 2, the driver supporting device 10 includes a radar sensor 101, an image sensor 102, a speed sensor 103, a driver characteristic coefficient calculating unit 104, a following vehicle detecting unit 105, a passenger detecting unit 106, a driving history database (DB) 107, a seat surface pressure sensor 108, a line-of-sight detection sensor 109, a collision determining unit 110, a braking limit time (BLT) determining unit 111, a time-to-collision (TTC) arithmetic operation unit 112, a warning timing control unit 113, and a warning data outputting unit 114.

Various sensors including the radar sensor 101, the image sensor 102 and the speed sensor 103 detect a warning target, such as a preceding vehicle with which a driver's vehicle will possibly collide, and also detect information (radar information, image information, and vehicle speed information) used to calculate the distance, the relative speed, and the like between the detected warning target and the driver's vehicle. These sensors (the radar sensor 101, the image sensor 102 and the speed sensor 103) can be shared with another vehicle-mounted system.

The collision determining unit 110 determines whether or not there is an obstacle ahead of the driver's vehicle, i.e., a warning target, such as a preceding vehicle with which the driver's vehicle will possibly collide on the basis of the pieces of information detected by the radar sensor 101, the image sensor 102 and the speed sensor 103, and calculates the distance, the relative speed, and the like between the detected warning target and the driver's vehicle, from the road situation.

When the collision determining unit 110 determines that there is a warning target, the braking limit time (BLT) determining unit 111 calculates a braking limit time (BLT). The braking limit time (BLT) is a time required for the driver to recognize an obstacle, i.e., a warning target, brakes suddenly, and stop his or her vehicle.

The driving history DB 107 stores information about the driving skills and the driving tendency of the driver in daily life. In this embodiment, although the driver supporting device 10 includes the driving history DB 107, the present embodiment is not limited to the aforementioned example, and the driving history DB may be provided outside the driver supporting device 10.

The driver characteristic coefficient calculating unit 104 calculates a driver characteristic coefficient (DCv) specific to the driver by referring to the driving history DB 107. In this Embodiment 1, the driver characteristic coefficient (DCv) specific to the driver differs according to the driving skills and the driving tendency of the driver, and its value expresses a collision avoidance characteristic specific to the driver. In this embodiment, it is assumed that the driver characteristic coefficient (DCv) is classified into one of Dc1 to Dc7 in accordance with the reaction time required for the driver to recognize warning information and deaccelerate the driver's vehicle.

The time-to-collision (TTC) arithmetic operation unit 112 calculates a time-to-collision (TTC) on the basis of both the braking limit time calculated by the braking limit time (BLT) determining unit 111 and the driver characteristic coefficient calculated by the driver characteristic coefficient calculating unit 104.

The following vehicle detecting unit 105 detects the existence or non-existence of a following vehicle.

The seat surface pressure sensor 108 is built in passengers' seats and detects the pressure of each seat surface.

The line-of-sight detection sensor 109 detects gazing points from data about passengers' lines of sight.

The passenger detecting unit 106 detects each passenger's state in accordance with the information detected by the seat surface pressure sensor 108 and the information detected by the line-of-sight detection sensor 109.

When the collision determining unit 110 determines that there is a warning target with which the driver's vehicle will possibly collide, the warning timing control unit 113 sets warning timings at which to issue warnings in accordance with the information detected by the following vehicle detecting unit 105 and the information detected by the passenger detecting unit 106.

The warning data outputting unit 114 outputs both data for indicating a warning for the driver's vehicle and data for indicating warning for a following vehicle, at the warning timings calculated by the warning timing control unit 113.

In this embodiment, although, as shown in FIG. 2, it is assumed that the driver supporting device 10 includes the various sensors (the radar sensor 101, the image sensor 102, the speed sensor 103, the seat surface pressure sensor 108, and the line-of-sight detection sensor 109), this embodiment is not limited to this example, and those sensors can be alternatively provided outside the driver supporting device 10.

Further, the warning indicating data outputted by the warning data outputting unit 114 is outputted, at least by any of voice or display, to an output device (not shown), so that a warning to urge the driver to perform a braking operation is provided in order to prevent a collision with the warning target.

Operations will be explained.

Figure 3:
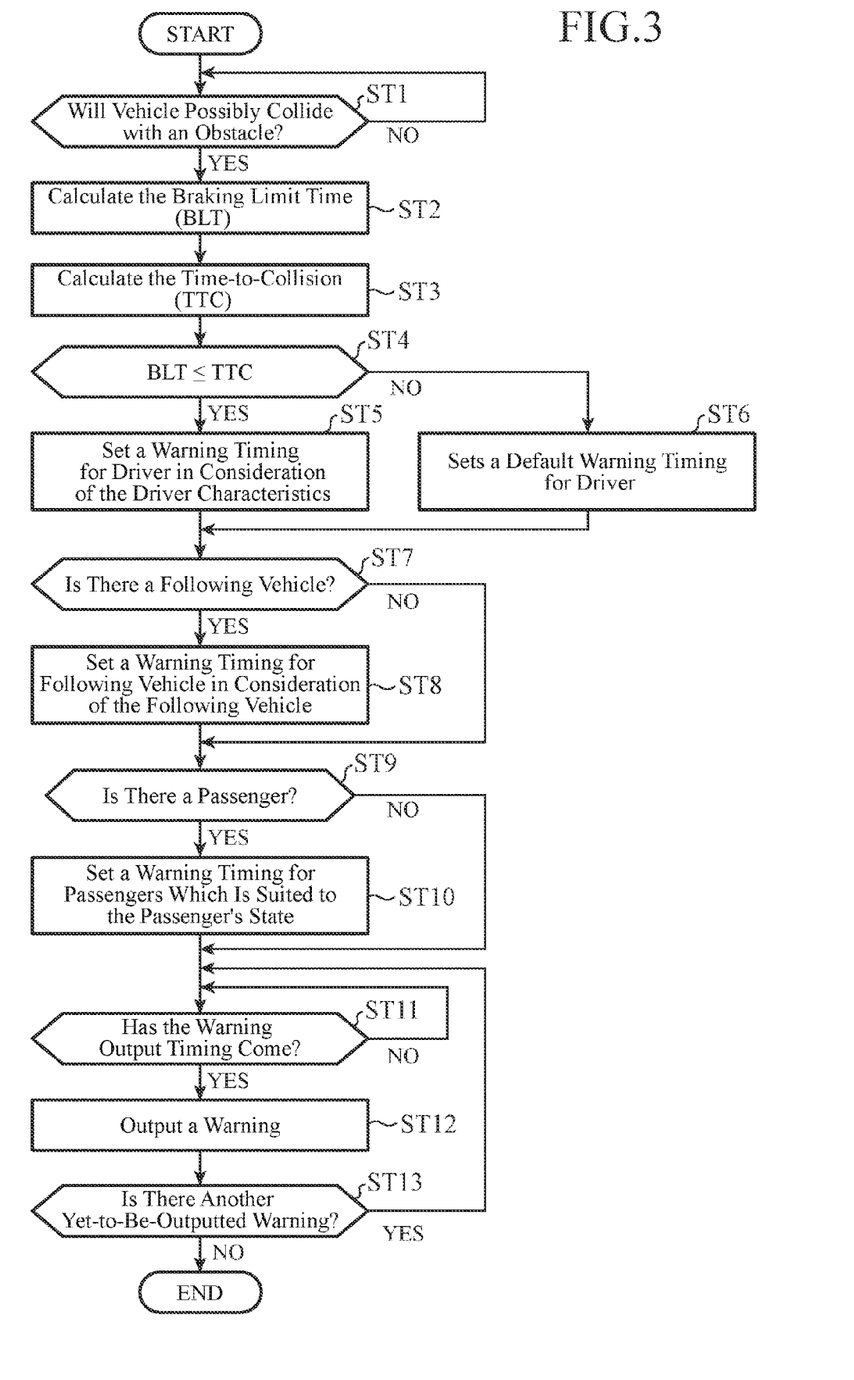
FIG. 3 is a flow chart explaining the operations of the driver supporting device according to Embodiment 1 of the present invention.

FIG. 3 is a flow chart explaining the operations of the driver supporting device 10 according to Embodiment 1 of the present invention.

The collision determining unit 110 determines the existence or non-existence of an obstacle ahead of the driver's vehicle, i.e., whether or not there is a warning target, such as a preceding vehicle with which the driver's vehicle will possibly collide on the basis of the pieces of information detected by the radar sensor 101, the image sensor 102 and the speed sensor 103 (in step ST1). Concretely, the collision determining unit 110 determines whether or not there is a warning target by determining, for example, whether the radar sensor 101 has detected a warning target or whether a warning target exists in an image detected by the image sensor 102. As an alternative, the collision determining unit 110 can determine whether or not there is a warning target by using another determining method.

When, in step ST1, determining that there is no warning target, such as a preceding vehicle with which the driver's vehicle will possibly collide (when "NO" in step ST1), the collision determining unit 110 repeats the process of step ST1.

In contrast, when, in step ST1, determining that there is a warning target, such as a preceding vehicle with which the driver's vehicle will possibly collide (when "YES" in step ST1), the collision determining unit 110 advances to step ST2.

The braking limit time (BLT) determining unit 111 calculates the braking limit time (BLT) (in step ST2).

In Embodiment 1, the braking limit time (BLT) is a time required for the driver to recognize an obstacle, i.e., a warning target, perform sudden braking, and stop the driver's vehicle. Concretely, the braking limit time (BLT) determining unit 111, in step ST2, determines the braking limit time by using the following equation (1).

$$\text{Braking limit time (BLT)} = \text{Reaction time (second)} + \text{Vehicle speed (speed per second)}/(\text{Gravitational acceleration } (9.8) \times \text{Coefficient of friction}) \quad (1)$$

Although there are variations among individuals in the reaction time shown in the equation (1), the average reaction time of persons is normally given as 0.75 seconds. A value ranging from 0.4 to 1 second is added to the average reaction time when the driver looks aside while driving, and a value ranging from 0.1 to 0.2 seconds is added to the average reaction time when the driver drives the vehicle under the influence of alcohol. (Source: Norio Takagi "Acknowledgement of Negligence in Driving Causing Death or Injury through Negligence (Gross Negligence) in the Pursuit of Social Activities", Report of Judicial Research 21-2, pp. 289 http://www.asahi-net.or.jp/~zi3h-kwrz/carstop.html)

Figure 4:
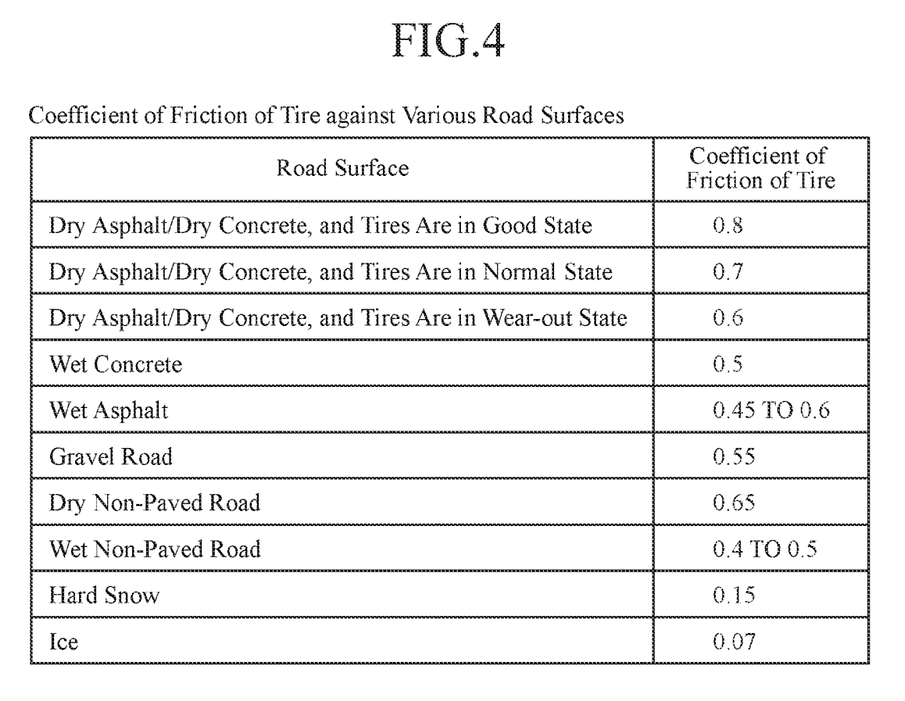
FIG. 4 is a diagram explaining an example of coefficients of friction.

Further, as the coefficient of friction shown in the equation (1), an appropriate value can be applied in accordance with the coefficients of friction of tires for various road surfaces as shown in FIG. 4 ((Source: Ichiro Emori "New Edition, Automobile Accident Engineering" (Gijyutsu Shoin, issued on May, Heisei 5) pp. 45, http://www5d.biglobe.ne.jp/Jusl/Keisanki/JTSL/TeisiSyasoku. html).

The states of various road surfaces and the state of the tires can be determined in accordance with, for example, the pieces of information detected by the various sensors including the radar sensor 101, the image sensor 102 and the speed sensor 103.

For example, assuming that the reaction time of ordinary persons is 0.7 seconds, the coefficient of friction is 0.7, and the vehicle speed is 50 km/h, the braking limit time (BLT) determining unit 111 calculates the braking limit time=2.72 seconds in accordance with the above-mentioned equation (1).

At this time, the stopping distance is 23.78 m. The stopping distance is determined to be equal to the addition of the free running distance and the brake stopping distance, as explained by referring to FIG. 1. In this embodiment, it is assumed that the free running distance is given by "the speed×the reaction time", and the brake stopping distance is given by "(the speed)$^2$/(2×9.8×the coefficient of friction)".

Returning to the flow chart shown in FIG. 3, the time-to-collision (TTC) arithmetic operation unit 112 calculates the time-to-collision (TTC) on the basis of both the braking limit time (BLT) calculated by the braking limit time (BLT) determining unit 111, and the driver characteristic coefficient calculated by the driver characteristic coefficient calculating unit 104 (in step ST3).

Hereafter, the operation of step ST3 will be explained in detail.

The driver characteristic coefficient calculating unit 104 refers to the driving history DB 107 in which the information about the driving skills and the driving tendency of the driver in daily life is stored, to calculate the driver characteristic coefficient (DCv). It is assumed that the driver characteristic coefficient (DCv) is classified into one of seven levels Dc1 to Dc7 in accordance with the reaction time required for the driver to recognize warning information and deaccelerate the driver's vehicle.

Figure 5:
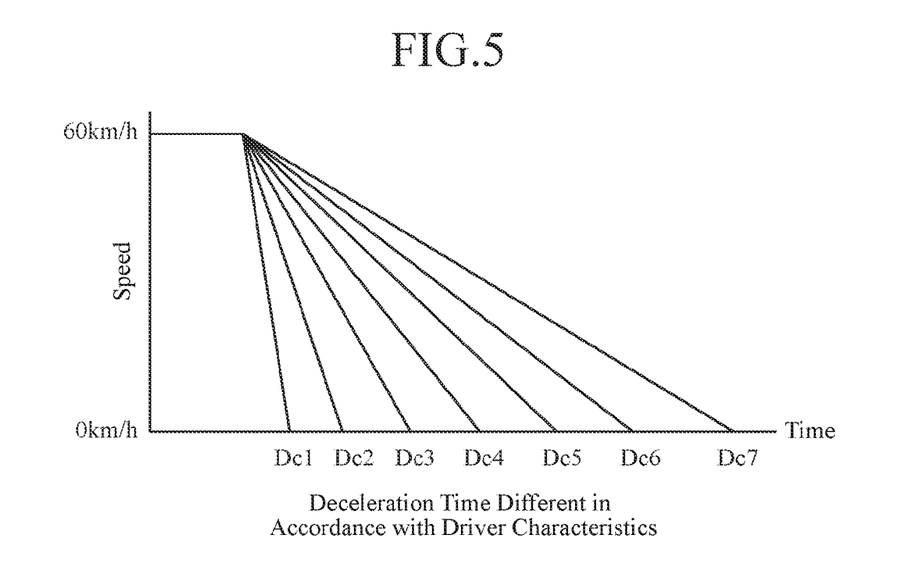
FIG. 5 is a diagram showing a relation between driver characteristic coefficients and deceleration.

FIG. 5 is a diagram showing a relation between the driver characteristic coefficient and deceleration. As shown in FIG. 5, the time required for the driver to decelerate the vehicle, i.e., the time for the driver to reduce the vehicle speed to zero increases as the level of the driver characteristic coefficient (DCv) rises.

Thus, the level of the driver characteristic coefficient (DCv) differs according to the driving skills and the driving tendency of the driver, and the collision avoidance characteristic specific to the driver can be expressed by the classification of the level. For example, in the case in which the driver quickly responds to variations in the traveling surroundings and usually makes quick movements in driving, the time-to-collision with a warning target is short, and the level of the driver characteristic coefficient (DCv) is low. In contrast, in the case in which the driver usually drives his vehicle with a safety margin, because the driver involves a longer time-to-collision with a warning target, the level of the driver characteristic coefficient (DCv) rises.

According to Embodiment 1, concretely, the level of the driver characteristic coefficient (DCv) of a driver who has the shortest reaction time is represented as "Dc1", and the level of the driver characteristic coefficient (DCv) of a driver who has the longest reaction time is represented as "Dc7". In this way, it is shown that as the level of the driver characteristic coefficient (DCv) rises from Dc1 to Dc7, the time-to-collision with an obstacle needs to be increased. More specifically, there is a necessity to set the position at which a warning is outputted to a position located further forward.

Explaining the level of the driver characteristic coefficient on the basis of the example for reference shown in FIG. 1, and assuming that, for example, the pattern A shows a driver A whose driver characteristic coefficient (DCv) is Dc1, because the driver A is a person having a short stopping distance, a short recognition and judgement time, and a short reaction time, it can be assumed that the driver A can avoid an obstacle sufficiently in "the braking limit time (BLT)+a" seconds. According to an experimental result, this pattern corresponds to a tendency which is demonstrated in forty-to-fifty-something male drivers. In contrast with this, assuming that, for example, the pattern B shows a driver B whose driver characteristic coefficient (DCv) is Dc7, because the driver B is a person having a long stopping distance, a long recognition and judgement time, and a long reaction time, compared with those of the driver A, the driver B requires "the braking limit time (BLT)+7a" seconds to avoid an obstacle. It is clear from experimental results that this pattern corresponds to a tendency which is demonstrated in senior drivers.

In this Embodiment 1, for example, the ranges of the respective reaction times corresponding to Dc1 to Dc7 are set in advance, and the driver characteristic coefficient calculating unit 104 determines that the driver's reaction time for variations in the usual traveling surroundings corresponds to which range, out of the preset ranges of the reaction times, on the basis of the information stored in the driving history DB 107, thereby setting the level of the driver characteristic coefficient (DCv) to any of Dc1 to Dc7. This setting method is an example, and the driver characteristic coefficient calculating unit 104 can set the level of the driver characteristic coefficient (DCv) to any of Dc1 to Dc7 by using another setting method.

Figure 6:
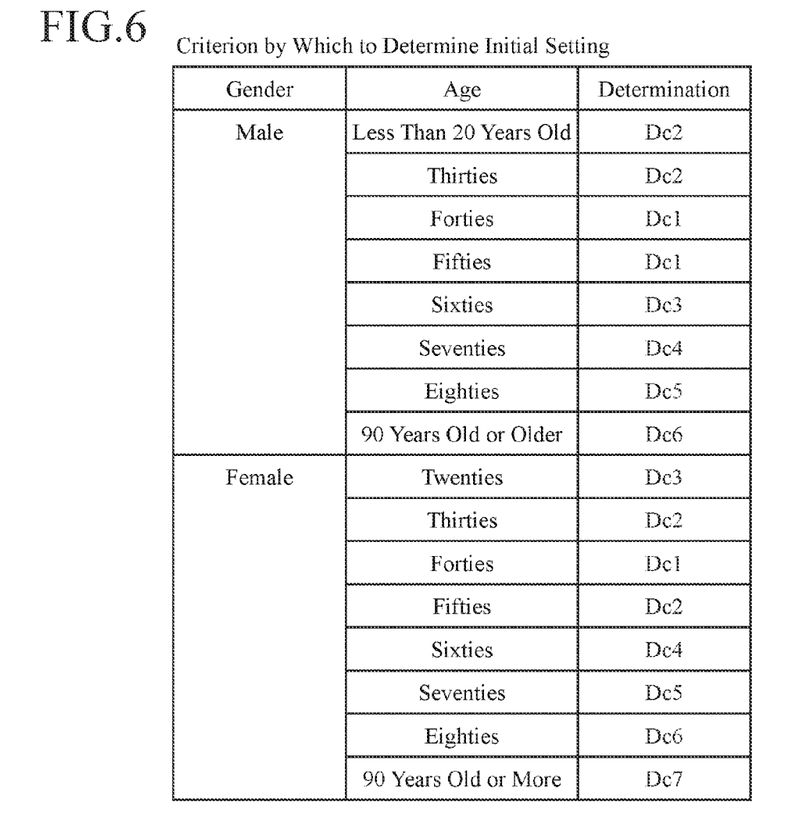
FIG. 6 is a diagram showing an example of a criterion for determination of an initial setting of a driver characteristic coefficient (DCv) based on the gender and the age of a driver.

Because the amount of information about the driving characteristics of the driver stored in the driving history DB 107 is not sufficient at an initial stage, the driver characteristic coefficient calculating unit 104 can set the level of the driver characteristic coefficient (DCv) to a level preset on the basis of, for example, the gender and the age of the driver, as shown in FIG. 6. Note that, as for the gender and the age of the driver, the age of a passenger is determined by acquiring the pieces of information detected by the line-of-sight detection sensor 109 and the seat surface pressure sensor 108, that is, the height of the line of sight, i.e., the sitting height, and the pressures applied to the seat surface, i.e., the weight, and the gender of the passenger is determined on the basis of an image of the passenger which is captured by the image sensor 102. Further, the gender and the age of each passenger can be stored in advance, and the determination method can be configured suitably.

Next, the driver characteristic coefficient calculating unit 104 sets the driver characteristic coefficient (DCv) in accordance with the set level (Dc1 to Dc7). In this embodiment, the driver characteristic coefficient calculating unit 104 sets the driver characteristic coefficient (DCv) in such a way that the driver characteristic coefficient (DCv) is high in proportion to an increase in the level of the driver characteristic coefficient (DCv). For example, when the level is Dc1, the driver characteristic coefficient calculating unit 104 sets the driver characteristic coefficient to 1.1, and, when the level is Dc7, sets the driver characteristic coefficient to 1.7.

By using the driver characteristic coefficient (DCv) which the driver characteristic coefficient calculating unit 104 sets in the above-mentioned way, the time-to-collision (TTC) arithmetic operation unit 112 calculates the time-to-collision (TTC) on the basis of the braking limit time calculated, in step ST2, by the braking limit time (BLT) determining unit 111, and the driver characteristic coefficient calculated by the driver characteristic coefficient calculating unit 104, in accordance with the following equations (2).

$$\text{Time-To-Collision (TTC)} = \text{Braking Limit Time (BLT)} \times \text{Driver Characteristic Coefficient (DCv)} \quad (2)$$

In Embodiment 1, because the driver characteristic coefficient (DCv) is high in proportion to an increase in the level of the driver characteristic coefficient, in such a way that when the level is Dc1, the driver characteristic coefficient is set to 1.1, and, when the level is Dc7, the driver characteristic coefficient is set to 1.7, the time-to-collision (TTC) also increases along with an increase in the level of the driver characteristic coefficient (DCv).

Returning to the flow chart shown in FIG. 3, the warning timing control unit 113 compares the braking limit time (BLT) calculated, in step ST2, by the braking limit time (BLT) determining unit 111, with the time-to-collision (TTC) calculated, in step ST3, by the time-to-collision (TTC) arithmetic operation unit 112, to determine whether BLT≤TTC (in step ST4).

When BLT≤TTC is not satisfied in step ST4 (when "NO" in step ST4), i.e., when the braking limit time (BLT) required for the driver to recognize a warning target, perform sudden braking, and stop the driver's vehicle exceeds the time-to-collision (TTC) which is based on the driver characteristics and which is the time required for the driver to perform an avoiding operation for the warning target, the warning timing control unit 113 sets a default warning output timing, i.e., a warning output timing preset on the basis of the braking limit time (BLT), as the timing at which to output a warning to urge the driver to perform a braking operation (in step ST6).

For the level of the driver characteristic coefficient (DCv) which is set to the driver in the case in which the driver usually makes quick movements in driving and has a short time-to-collision with a warning target, the driver characteristic coefficient (DCv) may be less than 1.0. In this case, BLT>TTC.

By setting a warning output timing based on the braking limit time (BLT), as shown in step ST6, the driver supporting device can urge the driver to perform a braking operation with more time to spare. Although in this embodiment, the driver supporting device urges the driver to perform a braking operation with more time to spare in this way, this embodiment is not limited to this example. The driver supporting device can alternatively urge the driver to perform a braking operation in accordance with the time-to-collision (TTC) based on the driver characteristics.

When BLT≤TTC is satisfied in step ST4 (when "YES" in step ST4), i.e., when the braking limit time (BLT) required for the driver to recognize a warning target, perform sudden braking, and stop the driver's vehicle is less than the time-to-collision (TTC) which is based on the driver characteristics, the warning timing control unit 113 calculates the warning timing (TA) in consideration of the driver characteristics in the following way and sets the warning timing as the timing at which to output a warning (in step ST5).

$$\text{Alarm Timing (TA)} = \text{Time-to-Collision (TTC)} = \text{Braking Limit Time (BLT)} \times \text{Driver Characteristic Coefficient (DCv)}$$

In Embodiment 1, the warning timing is the timing at which a warning is outputted so as to urge the driver to perform a braking operation at the position which is moved backward, by a distance corresponding to a required time, from the stop target position.
More specifically, in this embodiment, in order to prevent the driver from performing sudden braking, the driver supporting device advances the timing, at which the warning is outputted, by the required time in accordance with the driver characteristics.

By thus setting the warning timing (TA) in accordance with the driver characteristics, i.e., on the basis of the time-to-collision (TTC), the driver supporting device can output a warning at a more appropriate timing while preventing the driver from performing sudden braking. In this Embodiment 1, the warning timing at which to output a warning to urge the driver to perform a braking operation is defined as a first timing.

The warning timing control unit 113 determines whether or not there is a following vehicle (in step ST7). Concretely, the warning timing control unit 113 determines whether or not there is a following vehicle on the basis of the information detected by the following vehicle detecting unit 105. In this embodiment, the following vehicle detecting unit 105 can detect the information about a following vehicle behind the driver's vehicle on the basis of, for example, information about detection of the following vehicle by the radar sensor 101, information about detection of an image of the following vehicle by the image sensor 102, and information about detection of a variation in the vehicle speed by the speed sensor 103, and output the information about the following vehicle to the warning timing control unit 113. However, this method is an example, and the following vehicle detecting unit 105 can detect the information about the following vehicle by using another method.

When, in step ST7, determining that there is no following vehicle (when "NO" in step ST7), the warning timing control unit advances to step ST9.

When, in step ST7, determining that there is a following vehicle (when "YES" in step ST7), the warning timing control unit 113 further sets a warning timing for following vehicle which takes the following vehicle into consideration (in step ST8).

More specifically, the warning timing control unit 113 sets an earlier timing as the timing at which to output a warning for the following vehicle, in addition to the warning timing (first timing), which is set in step ST5 or ST6, to urge the driver to perform a braking operation. More specifically, the driver supporting device outputs a warning for the following vehicle at the earlier timing, and further outputs a warning to urge the driver in the driver's vehicle to perform a braking operation at the warning timing (first timing) set in step ST5 or ST6.

The warning timing for following vehicle is set in accordance with a braking limit time (BLT) set for the following vehicle. It is preferable to determine the braking limit time (BLT) set for the following vehicle by using the above-mentioned equation (1).

Next, the warning timing control unit 113 determines whether or not there is a passenger (in step ST9). Concretely, the warning timing control unit 113 determines whether or not there is a passenger on the basis of the information detected by the passenger detecting unit 106. In this embodiment, the passenger detecting unit 106 can detect passenger information from the information about passengers' positions and the number of passengers which are detected by the seat surface pressure sensor 108, and the information about each passenger's line of sight detected by the line-of-sight detection sensor 109, and output the passenger information to the warning timing control unit 113.

When, in step ST9, determining that there is no passenger (when "NO" in step ST9), the warning timing control unit 113 advances to step ST11.

In contrast, when, in step ST9, determining that there is a passenger (when "YES" in step ST9), the warning timing control unit 113 sets a warning timing for the passenger in accordance with the passenger's state (in step ST10).

Because there can be various cases in which the warning timing control unit 113 sets the warning timing for passengers in accordance with the passengers' state, some concrete examples will be explained hereafter.

For example, the warning timing control unit can set the warning timing for passengers by determining whether or not each passenger has noticed a warning target.

Concretely, the warning timing control unit 113 determines whether each passenger has noticed a warning target ahead of the vehicle on the basis of each passenger's line of sight which is acquired from the information about passengers' positions and the number of passengers and the information about each passenger's line of sight, which are detected by the passenger detecting unit 106. When a person who has not noticed a warning target is included in the passengers, for example, the warning timing control unit 113 further sets the warning timing for passengers which is advanced by a preset time, in addition to the warning timing (TA) for driver which is set in step ST5 or the default warning timing for driver which is set in step ST6, and, when there is a following vehicle, the warning timing for following vehicle set in step ST8, thereby preventing the driver from performing sudden braking. Concretely, the warning timing control unit 113 sets the warning timing (TA) in step ST5, and, when there is no following vehicle, further sets warning timings in such a way that a warning is outputted at a warning timing for passengers which is advanced, by the preset time, relative to the warning timing (TA) at which to urge the driver to perform a braking operation, and a warning is also outputted at the warning timing (TA) at which to urge the driver to perform a braking operation. In this Embodiment 1, the warning timing at which to output a warning for passengers is defined as a second timing.

By doing in this way, the driver supporting device simultaneously enables also a passenger who has not noticed the warning target to make a preparation for action in advance.

As is the same with the case above, the vehicle may be exemplified by a bus. In the bus, the driver supporting device certainly makes an announcement, such as "Caution, the bus suddenly stops", "Caution, the bus is turning to the right" or "Caution, the bus is turning to the left", before the bus performs sudden braking or makes a right or left turn, thereby enabling all the passengers to make preparations corresponding to the bus's behavior.

Further, the warning timing control unit 113, in step ST10, sets the warning timing for passengers, and, when all the passengers have noticed an obstacle ahead of the vehicle, can also cause the warning data outputting unit 114 to output warning data in which the sound volume of the warning is reduced to a moderate level (the operation of outputting the warning data which is performed by the warning data outputting unit 114 will be described below).

This operation is only an example, and the warning timing control unit can determine another warning timing on the basis of each passenger's line of sight or cause the warning data outputting unit 114 to output warning data having another description.

For example, when a passenger is a healthy adult, he or she can immediately notice that an attention attracting sound is outputted, and therefore perform a certain action. However, when a passenger is an auditorially handicapped person, a child or an elderly person, there is a case in which even if an attention attracting sound is outputted, he or she does not notice the attention attracting sound, slowly performs an action even if he or she notices the attention attracting sound, or cannot perform any action even if he or she notices the attention attracting sound (for example, when a passenger is a child or the like). Then, the driver supporting device can set the warning timing for passengers on the basis of the passengers' ages.

Concretely, the warning timing control unit 113 determines each passenger's age on the basis of the height of his or her line of sight, i.e., his or her sitting height, and the pressure applied to his or her seat surface, i.e., his or her weight, which are acquired from the pieces of information detected by the line-of-sight detection sensor 109 and the seat surface pressure sensor 108, and, when an elderly person or a child is included in the passengers, for example, sets the warning timing for passengers which is advanced, by the preset time, relative to the warning timing at which to urge the driver to perform a braking operation, in addition to the warning timing (TA) for driver which is set in step ST5 or the default warning timing for driver which is set in step ST6, and, when there is a following vehicle, the warning timing for following vehicle set in step ST8, thereby preventing the driver from performing sudden braking, and simultaneously increasing the time required for passengers' preparations for action in advance. The preset time can be 150 to 750 ms long, and can be appropriately set.

Figure 7:
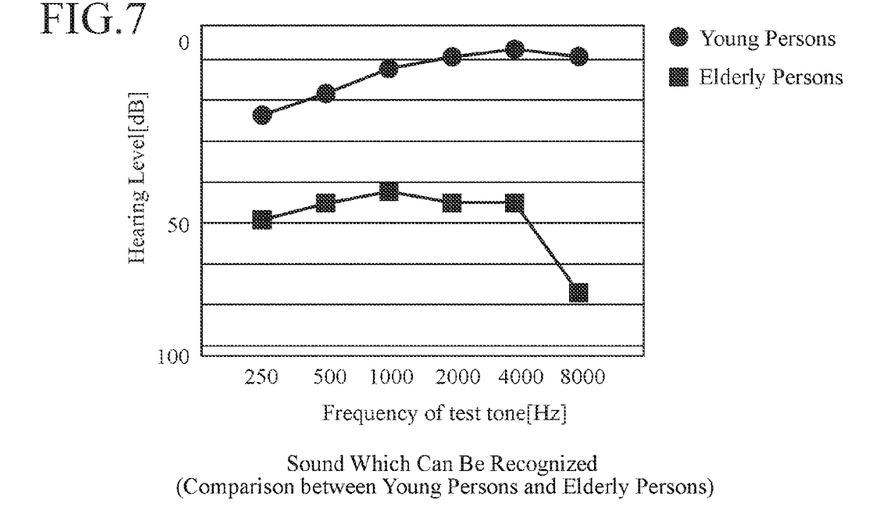
FIG. 7 is a diagram explaining an example of a result of comparing between sounds which can be recognized by young persons and sounds which can be recognized by elderly persons.

Further, when an elderly person is included in the passengers, the warning timing control unit 113 can cause the warning data outputting unit 114 to raise (increase) the sound pressure of the attention attracting sound, or output warning data to produce an attention attracting sound whose frequency is lowered at the warning timing for passengers (refer to FIG. 7, and it is seen, as shown in FIG. 7, that elderly persons have a tendency that the hearing level is extremely low, compared with that for young persons, at high frequencies.

Further, when a child is included in the passengers, the warning timing control unit 113 can cause the warning data outputting unit 114 to output warning indicating data to make a voice announcement notifying the meaning of the warning more concretely, together with the attention attracting sound, at the warning timing for passengers.

As an example, the case in which the warning timing control unit determines each passenger's age on the basis of his or her sitting height and his or her weight, which are acquired from the pieces of information detected by the line-of-sight detection sensor 109 and the seat surface pressure sensor 108 is shown in this embodiment. This case is only an example. For example, the warning timing control unit can alternatively store the ages of passengers in advance and determine each passenger's age, or can determine each passenger's age by using another method.

Figure 8:
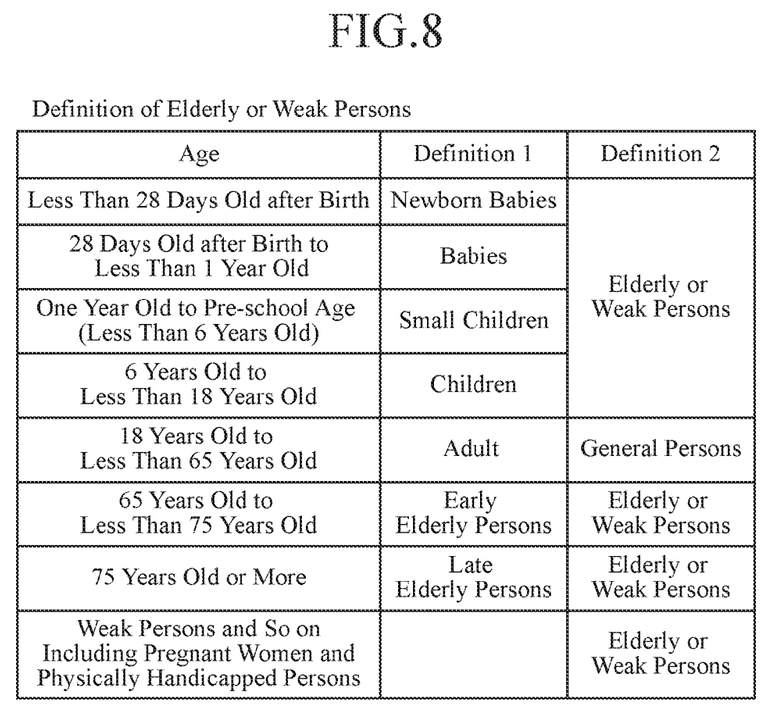
FIG. 8 is a diagram showing an example of the definition of children and elderly persons, or elderly or weak persons.

Further, the determination of whether or not a passenger is an elderly person or a child can be implemented by storing definitions as shown in FIG. 8 in advance, and then defining "newborn babies", "babies", "small children", and "children" as children and defining "early elderly persons" and "late elderly persons" as elderly persons, in accordance with, for example, the definition 1. As an alternative, the determination of whether or not a passenger is an elderly person or a child can be implemented in accordance with another definition. Further, for example, when determining that there is a passenger defined as an "elderly or weak person" in accordance with the definition 2, the warning timing control unit further advances the warning timing for passengers.

By doing in this way, even when the driver performs sudden braking, the driver supporting device makes it possible to protect the passengers sufficiently. As a similar case, the vehicle may be exemplified by an airplane. In the case of airplanes, it has been proven that the indication of a warning at an earlier warning timing makes it possible for the passengers to take a posture at the time of emergency landing at an earlier time, thereby increasing the survival rates of the passengers.

Further, for example, the warning timing control unit can set the warning timing for passengers on the basis of the passengers' seat positions.

Figure 9:
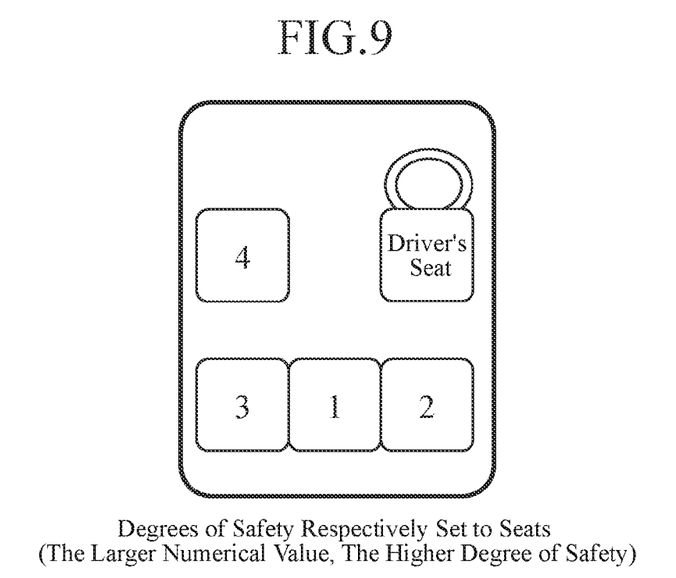
FIG. 9 is a diagram for explaining the degree of safety for each seat position.

Concretely, the warning timing control unit 113 determines each passenger's seat position from the information detected by the seat surface pressure sensor 108, and, when determining that a passenger is seated in the front seat next to the driver which, it is said, has the highest degree of risk (refer to FIG. 9 (Guidelines of the United States National Highway Traffic Safety Administration), and it has been proven, as shown in FIG. 9, that the smaller value the seat has, the higher degree of safety increases). For example, the warning timing control unit 113 sets the warning timing for passengers which is advanced, by the preset time, relative to the warning timing at which to urge the driver to perform a braking operation, in addition to the warning timing (TA) for driver which is set in step ST5 or the default warning timing for driver which is set in step ST6, and, when there is a following vehicle, the warning timing for following vehicle set in step ST8, thereby preventing the driver from performing sudden braking. The preset time can be 150 to 750 ms and can be appropriately set. Further, when a passenger is seated in a rear seat, the warning timing control unit 113 can detect whether or not the passenger is wearing a seatbelt, and, when the passenger is not wearing a seatbelt, cause the warning data outputting unit 114 to output warning data for calling attention, to urge the passenger to wear a seatbelt at a timing which is advanced relative to the warning timing at which to urge the driver to perform a braking operation.

By doing in this way, even when the driver performs sudden braking, the driver supporting device makes it possible to protect the passengers sufficiently.

Returning to the flow chart of FIG. 3, the warning data outputting unit 114 determines whether a timing at which to output warning data has come (in step ST11). Concretely, the warning data outputting unit 114 determines whether either the timing at which to output the warning data for the driver's vehicle (more specifically, the warning data for driver or the warning data for passengers), the timing being set, in step ST5, ST6, ST8 or ST10, by the warning timing control unit 113, or the timing at which to output the warning data for following vehicle has come.

The warning data outputting unit 114 determines whether the timing at which to output the pieces of the various warning data has come, on the basis of the distance and the relative speed between the warning target and the driver's vehicle which are determined by the collision determining unit 110.

When, in step ST11, determining that a timing at which to output warning data has come (when "YES" in step ST11), the data for warning outputting unit 114 outputs either the warning data for the driver's vehicle which is set, in step ST5, ST6, ST8 or ST10, by the warning timing control unit 113, or the warning data for following vehicle, either of the pieces of warning data corresponding to the timing at which to output the warning data (in step ST12). For example, when, in step ST11, determining that the warning timing (first timing) at which to output a warning to urge the driver to perform a braking operation has come, the warning data outputting unit 114 outputs the warning for driver.

Concretely, the warning data outputting unit 114 outputs warning data for outputting a warning by using a set outputting method, as the warning data for the driver's vehicle, to an output device (not shown). As the set outputting method, a method of outputting a predetermined sound (a warning sound or the like) or a method of outputting the warning data set by the warning timing control unit 113 can be used.

For example, when the warning data is the one for notifying warning information to the vehicle by using blinking, it is desirable to change a method of indicating the warning information in accordance with the emergency of the warning. Therefore, when the time-to-collision=the braking limit time, the warning timing control unit 113 outputs warning data, showing a blinking warning colored with red or orange having the highest visual attraction, to the warning data outputting unit 114. The warning data outputting unit 114 outputs the warning data to the output device in accordance with the content of the data from the warning timing control unit 113. At this time, the warning data is blinked at a high speed.

Further, although it is desirable that the output device is installed in, for example, a piece of window glass or the like which make it easy to recognize the warning, the installation location of the output device can be appropriately set.

Further, for example, when determining that the emergency of the warning is very high, the warning timing control unit 113 can output, as the warning data, auditory information along with the visual information, to the warning data outputting unit 114, and the warning data outputting unit 114 can output the warning data in accordance with the content of the data from this warning timing control unit 113. At this time, the frequency and the sound pressure of the sound can be changed in accordance with the emergency or the conditions in the vehicle (the existence or non-existence of a passenger, and whether or not an obstacle has been noticed). The emergency of the warning can be determined on the basis of a predetermined criterion. For example, the emergency of the warning is determined by setting thresholds for the braking limit time (BLT) and the time-to-collision (TTC). As an alternative, the emergency of the warning can be determined by using another determining method.

Further, in a case where the indication of a warning is provided at a timing advanced, by $\alpha$ seconds or more, relative to the timing based on the time-to-collision, for example, in a case where the warning timing is determined to be equal to "the time-to-collision+$\alpha$ seconds", the warning timing control unit 113 can avoid the use of red having the highest visual attraction, and output warning data showing a warning, which does not blink, but tints with color, such as yellow or green, having lower visual attraction than that of red, to the warning data outputting unit 114, and the warning data outputting unit 114 can output the warning data to an output device in accordance with the content of the data. At this time, when outputting auditory information, in order to prevent the driver from performing sudden braking in response to the sound, the driver supporting device can output warning indicating data whose frequency and sound pressure are adjusted.

Further, the warning data outputting unit 114 outputs the warning data for following vehicle to the output device mounted in a display device of the following vehicle, such as the instrument panel or an HUD, in accordance with the content of the data from the warning timing control unit 113.

For example, the warning data outputting unit 114 outputs the warning data for displaying a message to the effect that the driver is going to step on the brake because there is an obstacle ahead of the driver's vehicle.

By doing in this way, the driver supporting device can notify the driver of the following vehicle of the reason that the vehicle ahead applies brakes, thereby providing a feeling of safety for the driver of the following vehicle, compared with a method of lighting up the stop lamp prior to the actual brake pedaling operation, in order to prevent a collision with a preceding vehicle.

Although the example in which the warning timing control unit 113 calculates the warning timings on the basis of the information about a following vehicle and the information about passengers is shown in this Embodiment 1, this embodiment is not limited to this example, and the warning timing control unit 113 can alternatively determine only the existence or non-existence of a passenger and output a warning at the warning timing for passengers which is advanced relative to the warning timing at which to urge the driver to perform a braking operation, in accordance with whether or not there is a passenger.

The warning data outputting unit 114 determines whether or not there is another yet-to-be-outputted warning (in step ST13). More specifically, the warning data outputting unit 114 determines whether there is any other warning data which should be outputted, in addition to the warning data outputted in step ST12. For example, when the warning timing for driver and the warning timing for passengers are set, and the output of the warning for driver still remains after the warning timing for passengers has come and the warning data for passengers has been outputted, the warning data outputting unit 114 performs the above-mentioned process so as to prevent the output of the warning for driver from being left undone.

When, in step ST13, determining that there is another yet-to-be-outputted warning (when "YES" in step ST13), the warning data outputting unit 114 returns to step ST11. In contrast, when, in step ST13, determining that there is no other yet-to-be-outputted warning (when "NO" in step ST13), the warning data outputting unit ends the processing.

In this way, in accordance with the warning timing for driver (first timing) which is set in step ST5 by the warning timing control unit 113 or the default warning timing for driver (first timing) set in step ST6, the warning timing for following vehicle which is set in step ST8 when there is a following vehicle, and the warning timing for passengers (second timing) which is set in step ST10 when there is a passenger, the warning data outputting unit 114 outputs the warning data.

As mentioned above, according to this Embodiment 1, there can be provided a driver supporting device and a warning timing control method capable of, at the timing at which to issue a warning for a warning target, providing the warning to urge the driver to perform an appropriate braking operation, which does not make the driver feel inconvenience and which also provides passengers with a feeling of safety, by controlling the timing at which to issue the warning in accordance with the existence or non-existence of a passenger.

Although the driver supporting device 10 according to this Embodiment 1 has the configuration as shown in FIG. 2, the driver supporting device 10 can be alternatively configured so as to include only the warning timing control unit 113 and the data for warning outputting unit 114.

While the present invention has been described in its preferred embodiment, it is to be understood that various changes can be made in any component according to the embodiment, and any component according to the embodiment can be omitted within the scope of the invention.

Further, each unit used for control of the driver supporting device 10 according to Embodiment 1 can be implemented by program processing based on software and using a CPU.

Further, the driving history DB 107 according to Embodiment 1 can be configured with an HDD, a DVD, a memory, or the like.

INDUSTRIAL APPLICABILITY

Because the driver supporting device according to the present invention is configured so as to be able to present a more appropriate warning which does not make the driver feel inconvenience and which also provides passengers with a feeling of safety, at a timing at which to issue a warning for a warning target, by controlling the timing at which to issue the warning in accordance with the existence or non-existence of a passenger, the driver supporting device can be employed for a driver supporting device for vehicles, and so on, for issuing a warning to urge the driver to perform a braking operation, thereby supporting the driver.

REFERENCE SIGNS LIST

10 driver supporting device, 101 radar sensor, 102 image sensor, 103 speed sensor, 104 driver characteristic coefficient calculating unit, 105 following vehicle detecting unit, 106 passenger detecting unit, 107 driving history DB, 108 seat surface pressure sensor, 109 line-of-sight detection sensor, 110 collision determining unit, 111 braking limit time (BLT) determining unit, 112 time-to-collision (TTC) arithmetic operation unit, 113 warning timing control unit, and 114 warning data outputting unit.

The invention claimed is:

1. A driver supporting device that outputs warning data to urge a driver to perform a braking operation in order to prevent a collision with a warning target, comprising:
   a warning timing control unit to set a timing at which to output the warning data in accordance with existence or non-existence of a passenger when it is determined that a warning target which possibly collides with a driver's vehicle exists ahead of the driver's vehicle; and
   a warning data outputting unit to output the warning data in accordance with the timing set by the warning timing control unit,
   wherein when a passenger exists, the warning timing control unit sets, in addition to a first timing at which to output warning data to urge the driver to perform the braking operation, a second timing at which to output warning data for the passenger in accordance with a line of sight of the passenger, the second timing being advanced relative to the first timing, and
   the warning data outputting unit outputs the respective warning data in accordance with the first and second timings set by the warning timing control unit.

2. The driver supporting device according to claim 1, wherein the warning timing control unit sets the second timing also in accordance with an age of the passenger.

3. The driver supporting device according to claim 1, wherein the warning timing control unit sets the second timing also in accordance with the passenger's seat position.

4. The driver supporting device according to claim 1, wherein the warning timing control unit determines the first or second timing in accordance with the driver's driver characteristics.

5. The driver supporting device according to claim 1, further comprising a time-to-collision arithmetic operation unit to calculate a time-to-collision required for the driver to perform an avoiding operation for the warning target, and the warning timing control unit calculates the first or second timing in accordance with the time-to-collision.

6. The driver supporting device according to claim 5, wherein the time-to-collision arithmetic operation unit calculates the time-to-collision in accordance with a speed of the driver's vehicle and driver characteristics.

7. An warning timing control method for a driver supporting device that outputs warning data to urge a driver to perform a braking operation in order to prevent a collision with a warning target, the warning timing control method comprising:

in a warning timing control unit, setting a timing at which to output the warning data in accordance with existence or non-existence of a passenger when it is determined that a warning target which possibly collides with a driver's vehicle exists ahead of the driver's vehicle; and in a warning data outputting unit, outputting the warning data in accordance with the timing set by the warning timing control unit, wherein the warning timing control method further comprises:

in the warning timing control unit, when a passenger exists, setting, in addition to a first timing at which to output warning data to urge the driver to perform a braking operation, a second timing at which to output warning data for the passenger in accordance with a line of sight of the passenger, the second timing being advanced relative to the first timing, and in the warning data outputting unit, outputting the respective warning data in accordance with the first and second timings set by the warning timing control unit.

* * * * *